(12) United States Patent
Schedgick et al.

(10) Patent No.: US 7,377,523 B2

(45) Date of Patent: May 27, 2008

(54) HYDRAULIC SUSPENSION WITH A LOCK-OUT MECHANISM FOR AN OFF-HIGHWAY VEHICLE

(75) Inventors: David James Schedgick, Menasha, WI (US); Douglas Carl Blotz, Mukwonago, WI (US); Matthew James Rades, Oconomowoc, WI (US)

(73) Assignee: HUSCO International, Inc., Waukesha, WI (US)

( * ) Notice: Subject to any disclaimer, the term of this patent is extended or adjusted under 35 U.S.C. 154(b) by 491 days.

(21) Appl. No.: 10/847,241

(22) Filed: May 17, 2004

(65) Prior Publication Data

US 2005/0252699 A1 Nov. 17, 2005

(51) Int. Cl.
*B60G 17/04* (2006.01)

(52) U.S. Cl. .................................. 280/5.514

(58) Field of Classification Search ............. 280/5.514, 280/5.515, 124.158, 124.159, 124.161, 6.157, 280/6.159, 124.16; 188/266.2, 282.2, 282.6

See application file for complete search history.

(56) References Cited

U.S. PATENT DOCUMENTS

| | | | |
|---|---|---|---|
| 5,865,453 A * | 2/1999 | Harada et al. | 280/124.161 |
| 6,249,728 B1 | 6/2001 | Streiter | |
| 6,394,238 B1 | 5/2002 | Rogala | |
| 6,575,484 B2 * | 6/2003 | Rogala et al. | 280/124.158 |
| 6,578,855 B2 * | 6/2003 | Wallestad | 280/6.157 |
| 6,612,375 B2 | 9/2003 | Rogala | |
| 7,089,734 B2 * | 8/2006 | Cook et al. | 60/469 |

* cited by examiner

*Primary Examiner*—Faye M. Fleming
(74) *Attorney, Agent, or Firm*—Quarles & Brady; George E. Haas

(57) ABSTRACT

A vehicle has an axle connected to a frame by at least one hydraulic cylinder with two chambers separated by a piston. A hydraulic circuit controls flow of fluid between two cylinder chambers and between the chambers and an accumulator to dampen motion of the frame relative to the axle. The hydraulic circuit includes a control valve and a pair of check valves arranged so that the single control valve is able to lock-out the cylinder to emulate a rigid connection of the frame to the axle, as needed.

21 Claims, 1 Drawing Sheet

HYDRAULIC SUSPENSION WITH A LOCK-OUT MECHANISM FOR AN OFF-HIGHWAY VEHICLE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to suspension systems for off-road vehicles, such as those used in agricultural and construction businesses, and more particularly to adjustable hydraulically controlled suspension systems.

2. Description of the Related Art

Off-road vehicles, such as construction and agricultural equipment, carry a wide range of loads over different types of surfaces. Thus, the suspension systems between the wheels and the frame of these vehicles are important for optimum operator comfort, productivity and safety. The suspension system must be adjustable depending upon the weight of the load applied to the equipment. A very heavy load forces the vehicle body downward with respect to the axles, which can adversely affect the maneuverability of the vehicle. On the other hand, if the suspension is configured for relatively heavy loads, the vehicle may have an undesirable ride under lighter loads.

As a result, many vehicles have automatic load leveling systems which employ one or more hydraulic cylinders between the axle and the frame of the vehicle to ensure that the frame is maintained at the proper height above the axle. When a heavy load is applied to the frame, the drop of the frame is sensed and additional hydraulic fluid is applied to the cylinder to raise the frame to a desired distance from the axle. When that heavy load is removed from the vehicle, the frame rises significantly above the axle. When this occurs hydraulic fluid is drained from the cylinder to lower the frame with respect to the axle. This type of automatic hydraulic load leveling system ensures that the frame and axle are maintained at the desired separation regardless of the size of the load applied to the vehicle.

The hydraulic cylinder also functions as a shock absorber by regulating the flow of fluid from a chamber on one side of the piston to the chamber on the other side as the vehicle bounces when traveling over the ground. Although this shock absorbing action is beneficial to creating a smoother ride and greater operator comfort, there are times when it is necessary to lock-out the front axle to produce a "solid axle". For example, when the vehicle is carrying a heavy load there may not be a need for shock absorber action of the suspension as the tire perform that task. Also the shock absorber action is not required at relatively low speeds.

The lock-out function in prior suspension systems employed a plurality of electrically operated hydraulic valves to block the flow of fluid between the cylinder chambers in additional to flow between each chamber and sources of fluid, such as a pump and an accumulator. This multiple valve arrangement added significantly to the expense of the suspension.

Therefore, it is desirable to provide a less expensive lock-out mechanism which does not adversely affect the performance characteristics of the suspension system.

SUMMARY OF THE INVENTION

A hydraulic circuit for controlling a suspension of an off-highway vehicle that has a cylinder with a piston which defines a first chamber and a second chamber within the cylinder. The hydraulic circuit has a first node to which the first chamber of the cylinder is connected and a second node to which the second chamber is connected. A first check valve, connected between the first node and the second node, allows fluid to flow only in a direction from the second node to the first node.

A control valve connects the first node to an accumulator. A second check valve couples the second node to the accumulator and allows fluid to flow only in a direction from the accumulator to the second node.

In the preferred embodiment of the hydraulic circuit, the control valve has a closed position in which fluid is allowed to flow through the valve only from the accumulator to the first node, and fluid is blocked from flowing in an opposite direction. The control valve has a open position in which fluid is able to flow in either direction between the accumulator and the first node. As a variation of this embodiment, a conventional load leveling system is connected to the hydraulic circuit to supply and drain fluid from the cylinder in order to maintain the piston generally centered in the cylinder as the load on the vehicle changes.

When the control valve is open, forces exerted on the suspension system cause the cylinder to compress and extend freely as the fluid is able to flow in both directions between the cylinder and the accumulator. The degree to which the control valve opens can be varied to alter the amount of motion damping provided by the cylinder. Closing the control valve places the suspension hydraulic circuit 30 in the locked-out state which replicates a suspension in which the axle is rigidly connected to the vehicle frame. Now fluid attempting to exit the second chamber is blocked from reaching the accumulator by the second check valve and the control valve. In this state, the first check valve and the control valve block any fluid attempting to exit the second chamber of the cylinder. As a consequence, the cylinder piston is unable to extend or retract in either direction and the position of the suspension remains stationary. This hydraulic circuit configuration enables engagement and disengagement of the lock-out function to be performed by a single control valve.

If desired, the present hydraulic circuit configuration also permits both the compression and extension of the cylinder in response to forces acting of the vehicle to be dampened with a single control valve.

DETAILED DESCRIPTION OF THE INVENTION

Figure 1:
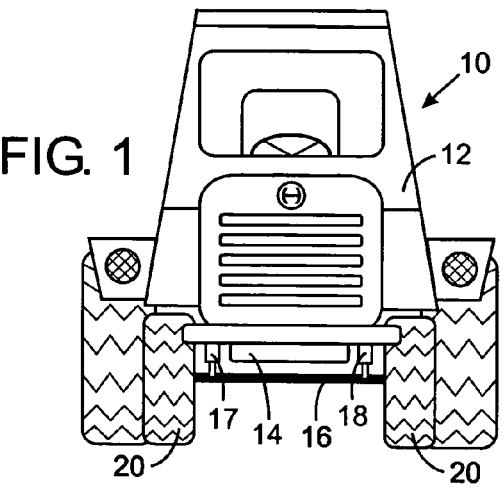
FIG. 1 is a front view of an agricultural tractor the incorporates a suspension system according to the present invention.

With initial reference to FIG. 1, an off-road vehicle 10, such as an agricultural tractor, has a body 12 with a frame 14 that is linked to axles to which the wheels of the vehicle are attached. For example, the front axle 16 is coupled to the frame 14 by a pair of hydraulic cylinders 17 and 18 and has a pair of front wheels 20 attached to it. As will be described, pressurized hydraulic fluid is applied to and drained from the cylinders 17 and 18 to control the distance that the body 12 of the tractor is above the front axle 16. This hydraulic system adjusts dynamically to ensure that a relatively constant separation distance exists regardless of the load applied to the vehicle 10.

Figure 2:
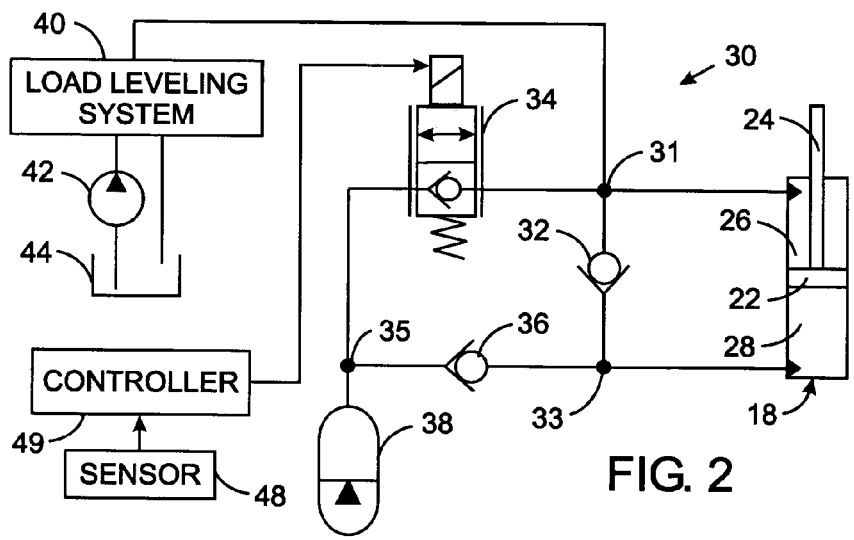
FIG. 2 is a schematic diagram of a first embodiment of the hydraulic circuit of the suspension system.

The control of the tractor suspension shall be described with respect to cylinder 18 with the understanding that the other cylinder 17 is controlled in the identical manner. Referring to FIG. 2, the cylinder 18 has an internal bore in which a piston 22 with a rod 24 is slidably received; thereby forming a first, or rod, chamber 26 and a second, or piston, chamber 28 within the cylinder on opposite sides of the piston. The rod and piston chambers 26 and 28 vary in volume as the piston 22 moves within the cylinder 18. In order to understand the subsequent description of the system operation, it is important to note that some of the volume of the rod chamber is taken up by the piston rod 24. Therefore, a smaller quantity of fluid is required to retract the rod into the cylinder (i.e. compress the cylinder) than is required to extend the piston rod (i.e. extend the cylinder) the same distance. Either the cylinder 18 or piston rod 24 is attached to the tractor frame 14, while the other one is attached to the front axle 16.

In a first embodiment of the present invention, the cylinder 18 is connected to a regenerative hydraulic circuit 30 that controls the flow of fluid into and out of each cylinder chamber 26 and 28. The hydraulic circuit 30 has a first node 31 to which the rod chamber 26 is connected and a second node 33 to which the piston chamber 28 is connected. A first check valve 32 is connected directly between the first and second nodes 31 and 33, and thus directly between the two cylinder chambers 26 and 28. The first check valve 32 is oriented to allow fluid to flow only in a direction from the second node 33 to the first node 31. The terms "directly connected" and "directly connecting" as used herein mean that the associated components are connected together by a conduit without any intervening element, such as a valve, an orifice or other device, which restricts or controls the flow of fluid beyond the inherent restriction of any conduit and its couplings.

An accumulator 38, of a type conventionally used in suspension systems, is coupled by a second check valve 36 to the second node 33. The second check valve 36 permits fluid to flow only in the direction from the accumulator 38 to the second node 33. Conventional devices, such as ball or poppet style check valves can be used as the first and second check valves 32 and 36. A third node 35 is defined in the conduit between the second check valve 36 and the accumulator 38.

Figure 3:
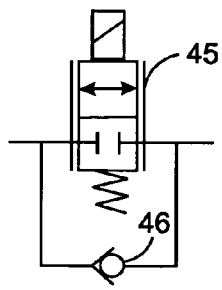
FIG. 3 illustrates an alternative electrohydraulic valve assembly for the first embodiment of the hydraulic circuit.

An electrohydraulic poppet control valve 34 is connected between the rod chamber 26 and the accumulator 38. The control valve 34 unidirectional in that it only controls the flow of fluid from the first node 31 to the third node 35. Specifically, in the closed position, show in the drawing, fluid flow can occur through the valve from the third node 35 to the first node 31, but flow in the opposite direction is blocked. In the open position, fluid is able to flow in either direction through the control valve 34. A solenoid or other type of electrical actuator operates the control valve 34 to open the valve to varying degrees and thus proportionally control the flow of fluid there through. Several types of poppet and spool valves may be used for the control valve 34. FIG. 3 shows an alternative configuration that employs an electrohydraulic pilot valve 45 having a fully closed position, which blocks flow in both directions, and a parallel connected external check valve 46. Therefore, as used herein the term "control valve" includes the various valve assemblies, including a plurality of physically separate valves, which perform the function of the control valve 34 as described herein.

By controlling the flow area of the control valve 34 on a real-time basis, the degree to which the suspension dampens motion of the vehicle body 12 can be changed dynamically. This is possible with a single valve because the first and second check valves 32 and 36 direct the fluid flow through the control valve 34 during both extension and compression of the cylinder 18. In contrast, previous systems required a pair of valves that independently controlled the compression flow and extension flow to adjust the degree of motion damping.

Referring again to FIG. 2, the motion damping function is implemented with a sensor 48 that is attached to the body 12 or frame 14 of the vehicle 10. The sensor provides an electrical input signal to a controller 49 which operates the control valve 34. The sensor 48 may be an accelerometer in which case the electrical input signal indicates acceleration of the vehicle body 12 and the controller 49 integrates that signal to derive the velocity of the body. Alternatively, the sensor 48 can detect the displacement or position of the frame 14 with respect to the axle 16 and the controller differentiates the sensor signal to obtain the vehicle body's velocity. The controller 49 responds to the velocity by determining the amount of flow that is required between the cylinder chambers to dampen that velocity and thus determine the degree to which the control valve should open.

The hydraulic circuit 30 enables a single proportional control valve 34 to proportionally control extension and compression damping of the vehicle suspension and to provide a cylinder lock-out function. When the control valve 34 is open, forces exerted on the suspension system cause the cylinder 18 to compress and extend freely as the fluid is able to flow in either direction between the cylinder chambers 26 and 28 and the accumulator 38.

When the cylinder 18 compresses and the piston chamber 28 becomes smaller, fluid flow from the piston chamber directly to the accumulator 38 is blocked by the second check valve 36. Instead that flow is routed through the first check valve 32 to the first node 31. From the first node 31, some of the fluid fills the smaller rod chamber 26, while the rest of the fluid flows through the control valve 34 into the accumulator 38 where it is stored.

When the cylinder extends, the fluid exiting the rod chamber 26 is blocked by the first check valve 32. As a result this fluid is directed through the control valve 34 and the second check valve 36 into the piston chamber 28 of the cylinder 18. Because the expanding piston chamber 28 requires more fluid than is exiting the rod chamber 26, additional fluid is drawn from the accumulator 38 through the second check valve 36 into the piston chamber 28 to prevent cavitation.

Closing the control valve 34 places the suspension hydraulic circuit 30 in the lock-out state. Now fluid attempting to exit the piston chamber 28 is blocked from reaching the accumulator by the second check valve 36 and the closed control valve 34. Although the rod chamber 26 is tending to expand, its smaller size is insufficient to contain all the fluid attempting to exit the piston chamber 28. Alternatively in this closed state of the control valve 34, any fluid attempting to exit the cylinder rod chamber 26 is blocked by the first check valve 32 and the control valve. As a result, the piston 22 is unable to move significantly in either direction and the position of the vehicle suspension remains stationary.

An optional conventional load leveling system 40 controls the flow of pressurized fluid from a pump 42 to the first node 31 between the rod chamber 26 and the control valve 34 in the hydraulic circuit 30. This system 40 also controls the flow of fluid from that first node 31 to a tank 44 that supplies the pump 42. Alternatively the load leveling system 40 can be connected to the second or third node 33 or 35. The load leveling system 40 includes a sensor (not shown) which detects the distance between the tractor frame 14 and the axle 16. The load leveling system 40 responds to relatively long duration changes in that distance which as noted previously are caused by variation of the load applied to the tractor. If that frame to axle distance is significantly small, as occurs under a heavy load, fluid from the pump 42 is fed into the first node 31. With the control valve 34 open, that pressure is applied to the rod chamber 26 of the cylinder 18 and through the second check valve to the cylinder piston chamber. Because the surface area of the piston 22 is greater in the piston chamber 28, the rod 24 will extend, raising the tractor frame 14 with respect to the axle 16. Alternately, when that frame to axle distance is significantly large, as occurs when a heavy load is removed, the load leveling 40 drains fluid from the first node 31 into the tank 44 which retracts the piston rod 24 lowering the tractor frame 14 toward the axle 16.

The load leveling system 40 also operates to relieve excessive pressure which may occur in the hydraulic circuit 30. In order for a pressure relief valve in the load leveling system 40 to respond to excessive pressure in all sections of the hydraulic circuit 30 that system must be connected at the first node 31. Otherwise, a load leveling system, connected to the second or third node 33 or 35, will be isolated from a section of the hydraulic circuit 30 by the first or second check valve 32 or 36 when the control valve 34 is closed.

Figure 4:
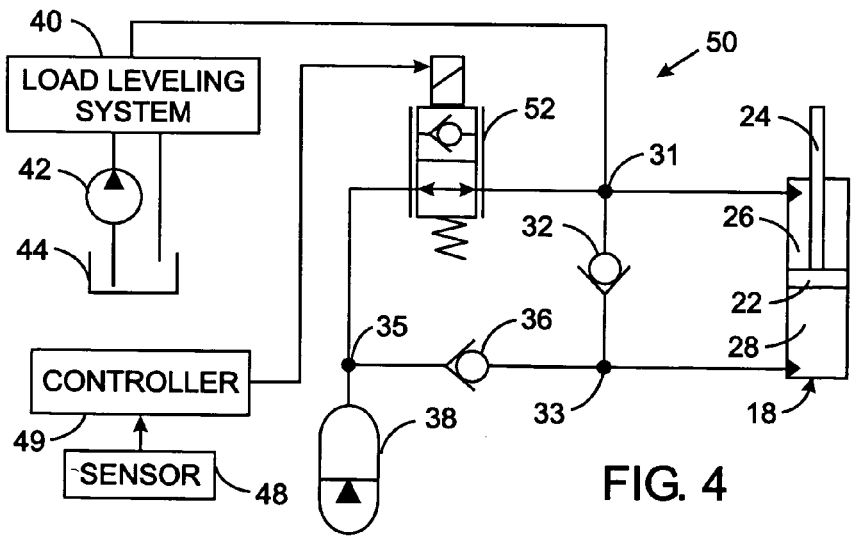
FIG. 4 is a schematic diagram of a second embodiment of the hydraulic circuit of the suspension system.

FIG. 4 shows a second regenerative hydraulic circuit 50 which utilizes a normally-open electrohydraulic poppet control valve 52 in place of the normally-closed valve 34 in FIG. 4. Otherwise, the two hydraulic circuits function in the same manner and identical components have been assigned the same reference numerals in both figures.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A hydraulic circuit for controlling a suspension of a vehicle having a cylinder with a piston that defines a first chamber and a second chamber within the cylinder, said hydraulic circuit comprising:
    an accumulator;
    a first node to which the first chamber of the cylinder is connected;
    a second node to which the second chamber of the cylinder is connected;
    a first check valve connected to the first node and the second node and allowing fluid to flow only in a direction from the second node to the first node;
    a second check valve coupling the second node to the accumulator and allowing fluid to flow only in a direction from the accumulator to the second node; and
    a control valve directly connected to and between the first node and the accumulator, wherein closing the control valve inhibits movement of the piston.

2. The hydraulic circuit as recited in claim 1 wherein the control valve has a closed position in which fluid is allowed to flow in a direction from the accumulator to the first node and in which fluid is blocked from flowing in an opposite direction, and has an open position in which fluid is allowed to flow in either direction between the accumulator and the first node.

3. The hydraulic circuit as recited in claim 2 wherein the control valve is biased by a spring into the closed position.

4. The hydraulic circuit as recited in claim 2 wherein the control valve is biased by a spring into the open position.

5. The hydraulic circuit as recited in claim 1 wherein the control valve is electrically operated.

6. The hydraulic circuit as recited in claim 1 wherein first chamber of the cylinder is a rod chamber and the second chamber is a piston chamber.

7. The hydraulic circuit as recited in claim 1 further comprising a load leveling system connected to one of the first node, the second first node, and the accumulator.

8. The hydraulic circuit as recited in claim 1 further comprising:
    a sensor which senses a parameter which varies with motion of the vehicle; and
    a controller connected to the sensor and responding to the parameter by operating the control valve to vary an amount of motion damping provided by the suspension.

9. A hydraulic circuit for controlling a suspension of a vehicle having a cylinder with a piston that defines a first chamber and a second chamber within the cylinder, said hydraulic circuit comprising:
    an accumulator;
    a first check valve connected to the cylinder and allowing fluid to flow only in a direction from the second chamber to the first chamber;
    a second check valve directly connecting the second chamber to the accumulator and allowing fluid to flow only in a direction from the accumulator to the second chamber; and
    a control valve directly connecting the first chamber of the cylinder to the accumulator, wherein closing the control valve inhibits movement of the piston.

10. The hydraulic circuit as recited in claim 9 wherein the control valve has a closed position in which fluid is allowed to flow in a direction from the accumulator to the first chamber and is blocked from flowing in an opposite direction, and has an open position in which fluid is able to flow in either direction between the accumulator and the first chamber.

11. The hydraulic circuit as recited in claim 10 wherein the control valve is biased by a spring into the closed position.

12. The hydraulic circuit as recited in claim 10 wherein the control valve is biased by a spring into the open position.

13. The hydraulic circuit as recited in claim 9 wherein the control valve is electrically operated.

14. The hydraulic circuit as recited in claim 9 further comprising a load leveling system connected to one of the first chamber, the second chamber, and the accumulator.

15. The hydraulic circuit as recited in claim 9 further comprising:
   a sensor which senses a parameter which varies with motion of the vehicle; and
   a controller connected to the sensor and responding to the parameter by operating the control valve to vary an amount of motion damping provided by the suspension.

16. A hydraulic circuit for controlling a suspension of a vehicle having a cylinder with a piston that defines a first chamber and a second chamber within the cylinder, said hydraulic circuit comprising:
   an accumulator;
   a first node to which the first chamber of the cylinder is connected;
   a second node to which the second chamber of the cylinder is connected;
   a first check valve directly connected between the first node and the second node and allowing fluid to flow only in a direction from the second node to the first node;
   a second check valve directly connected between the second node and the accumulator and allowing fluid to flow only in a direction from the accumulator to the second node; and
   an electrohydraulic control valve directly connected between the first node and the accumulator, wherein the electrohydraulic control valve has an open position in which fluid is allowed to flow in either direction between the accumulator and the first node, and has a closed position in which fluid is allowed to flow in a direction from the accumulator to the first node and in which fluid is blocked from flowing in an opposite direction, in the closed position movement of the piston is inhibited.

17. The hydraulic circuit as recited in claim 16 wherein the electrohydraulic control valve is biased by a spring into the closed position.

18. The hydraulic circuit as recited in claim 16 wherein the electrohydraulic control valve is biased by a spring into the open position.

19. The hydraulic circuit as recited in claim 16 further comprising a load leveling system connected to one of the first node, the second first node, and the accumulator.

20. The hydraulic circuit as recited in claim 16 further comprising:
   a sensor which senses a parameter which varies with motion of the vehicle; and
   a controller connected to the sensor and responding to the parameter by operating the control valve to vary an amount of motion damping provided by the suspension.

21. The hydraulic circuit as recited in claim 1 wherein the first node is directly connected to the first chamber; the second node is directly connected to the second chamber; and the first check valve is directly connected to the first node and the second node.

* * * * *